United States Patent [19]

Lee et al.

[11] Patent Number: 5,503,527
[45] Date of Patent: Apr. 2, 1996

[54] TURBINE BLADE HAVING TIP SLOT

[75] Inventors: Ching-Pang Lee, Cincinnati; Edward F. Pietraszkiewicz, Maineville; Chander Prakash, West Chester; Ronald D. Zerkle, Cincinnati, all of Ohio

[73] Assignee: General Electric Company, Cincinnati, Ohio

[21] Appl. No.: 329,750

[22] Filed: Dec. 19, 1994

[51] Int. Cl.⁶ ........................................ F01D 5/18
[52] U.S. Cl. .................. 416/91; 416/97 R; 415/173.1
[58] Field of Search ...................... 416/91, 90 R, 416/96 R, 96 A, 97 R, 231 R, 231 B; 415/171.1, 173.1

[56] References Cited

U.S. PATENT DOCUMENTS

| | | |
|---|---|---|
| 3,635,585 | 1/1972 | Metzler, Jr. . |
| 3,885,886 | 5/1975 | Richter .................................. 416/97 R |
| 4,010,531 | 3/1977 | Andersen et al. . |
| 4,390,320 | 6/1983 | Eiswerth . |
| 4,424,001 | 1/1984 | North et al. . |
| 4,761,116 | 8/1988 | Braddy et al. .......................... 416/97 R |
| 5,176,499 | 1/1993 | Damlis et al. . |
| 5,183,385 | 2/1993 | Lee et al. . |
| 5,246,340 | 9/1993 | Winstanley et al. . |
| 5,403,158 | 4/1995 | Auxier .................................... 416/97 R |

Primary Examiner—Edward K. Look
Assistant Examiner—James A. Larson
Attorney, Agent, or Firm—Andrew C. Hess; Patrick R. Scanlon

[57] ABSTRACT

A gas turbine engine rotor blade includes an airfoil having first and second sidewalls joined together at leading and trailing edges. First and second tip walls extend from adjacent the leading edge along the respective first and second sidewalls to adjacent the trailing edge and are spaced apart to define a tip cavity therebetween. A first notch is disposed in the first tip wall adjacent to the leading edge for channeling into the tip cavity a portion of combustion gases flowable over the airfoil for reducing the heating effect of the gases on the blade tip. In a preferred embodiment, a second notch is disposed adjacent to the trailing edge for promoting flow through the tip cavity from the first notch.

9 Claims, 3 Drawing Sheets

TURBINE BLADE HAVING TIP SLOT

The present invention relates generally to gas turbine engines, and, more specifically, to cooled turbine rotor blades thereof.

BACKGROUND OF THE INVENTION

A gas turbine engine such as that used for powering an aircraft in flight includes a combustor which generates hot combustion gases, with the discharge therefrom flowing through a high pressure turbine nozzle which directs the combustion gases to a row of turbine rotor blades which extract energy therefrom for rotating a disk and shaft joined thereto for typically powering a compressor of the engine. The first stage turbine rotor blades receive the hottest combustion gases in the engine and are therefore typically hollow and provided with various structures used for providing effective cooling thereof for ensuring useful operating lives therefor.

The turbine rotor blades typically include serpentine flow passages therein and various cooling holes through the airfoil pressure side, suction side, or tip as required. Cooling air is provided to the blade by bleeding a portion of relatively cool compressor air and suitably channeling it through the blade dovetail and into the blade for supplying the cooling structures therein. However, any air bled from the compressor which is used for cooling purposes is not therefore used in the combustion process which necessarily decreases the overall efficiency of the engine. It is therefore desirable to use as little as possible of compressor bleed flow for cooling purposes.

It is known that the combustion gases channeled over the turbine blades have a generally center peaked temperature profile between the roots and tips of the blades. It has recently been discovered in accordance with the present invention that secondary fluid flow patterns distort the temperature distribution over the blade airfoil resulting in a hotter gas temperature at the midchord region of the blade tip than that experienced at the leading edge on the blade pressure side. Accordingly, it is desirable to reduce the adverse heating effects of the combustion gases at turbine blade tips for reducing the cooling air requirements which would otherwise be required in the blade.

SUMMARY OF THE INVENTION

A gas turbine engine rotor blade includes an airfoil having first and second sidewalls joined together at leading and trailing edges. First and second tip walls extend from adjacent the leading edge along the respective first and second sidewalls to adjacent the trailing edge and are spaced apart to define a tip cavity therebetween. A first notch is disposed in the first tip wall adjacent to the leading edge for channeling into the tip cavity a portion of combustion gases flowable over the airfoil for reducing the heating effect of the gases on the blade tip. In a preferred embodiment, a second notch is disposed adjacent to the trailing edge for promoting flow through the tip cavity from the first notch.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
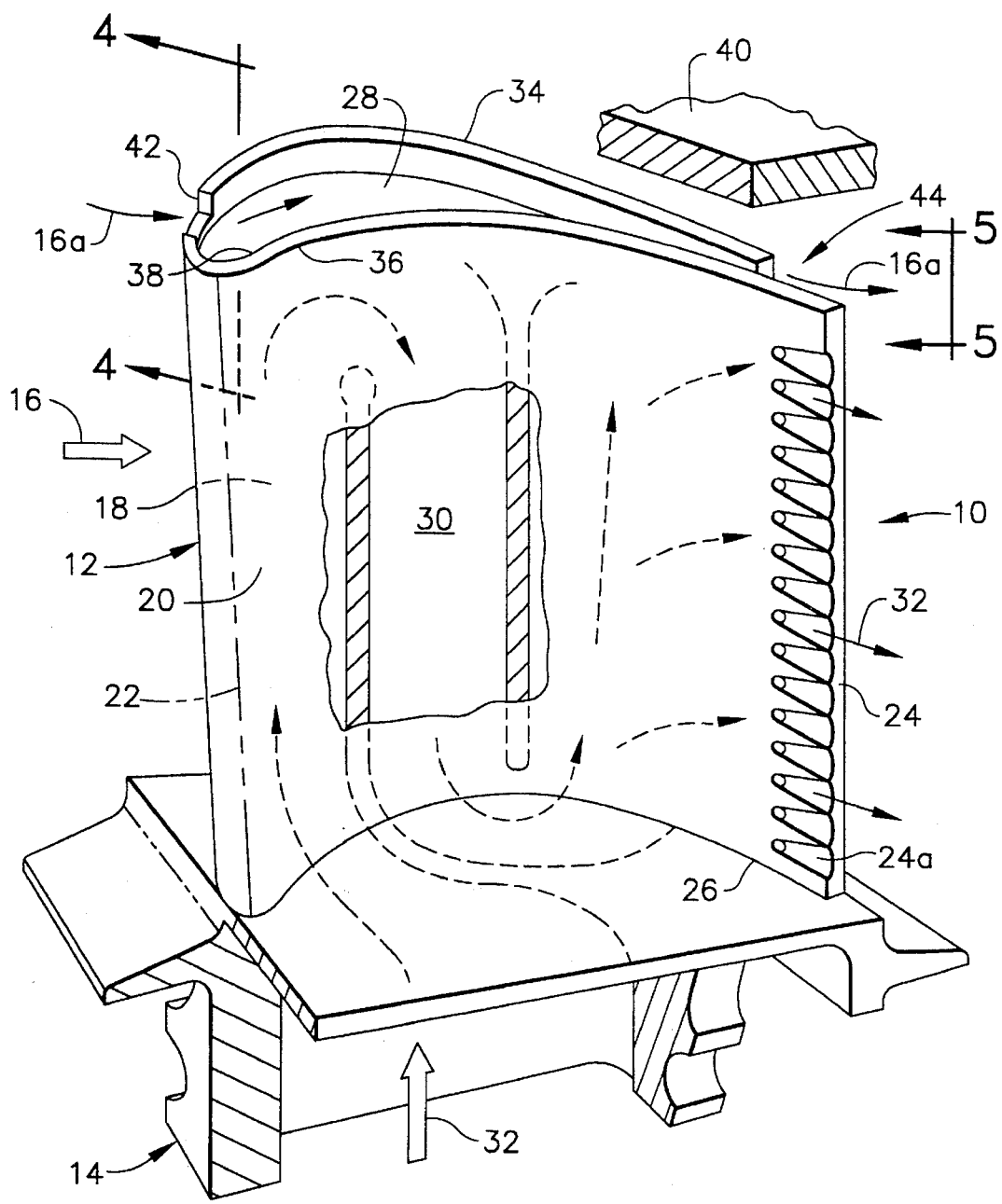
FIG. 1 is a perspective, partly sectional view of an exemplary gas turbine engine rotor blade having an improved tip in accordance with one embodiment of the present invention.

Illustrated in FIG. 1 is an exemplary gas turbine engine rotor blade 10 having a hollow airfoil 12 and an integral conventional dovetail 14 for mounting the airfoil 12 to a rotor disk (not shown) in a conventionally known manner. The blade 10 is representative of a first stage rotor blade disposed immediately downstream from a high pressure turbine nozzle (not shown) through which is channeled relatively hot combustion gas 16 generated in a conventional combustor (not shown).

The airfoil 12 includes a first, or convex sidewall 18 defining a suction side, and a second or concave sidewall 20 defining a pressure side which are joined together at a leading edge 22 at which the combustion gas 16 is first received and at a downstream spaced trailing edge 24 at which the combustion gas 16 exits the rotor stage. The airfoil 12 extends longitudinally or radially upwardly from a root 26 disposed at the top of the dovetail 14 to a tip plate 28 which defines an outer boundary of an internal cooling cavity or chamber 30 disposed in the airfoil 12. The cooling chamber 30 may take any conventional form and is typically in the form of a serpentine cooling passage which receives a cooling fluid 32 through the dovetail 14. Internal cooling of turbine rotor blades is well known and typically utilizes a portion of relatively cool compressed air bled from a compressor of the gas turbine engine (not shown) which is suitably channeled through the respective dovetail 14 of several rotor blades 10 mounted around the perimeter of the rotor disk. The cooling fluid enters the airfoil 12 from the root 26 and passes therethrough for suitably cooling the airfoil 12 from the heating effect of the combustion gas 16 flowable over the outer surfaces thereof. The airfoil 12 may have pressure or suction side film cooling holes therethrough, or both (not shown) for conventionally cooling the sidewalls thereof, with the spent cooling fluid 32 being typically discharged in part from the airfoil 12 through a row of trailing edge holes 24a.

The tip region or tip cap of the blade 10 typically includes a first squealer tip wall 34 which extends from adjacent the airfoil leading edge 22 along the airfoil first sidewall 18 to adjacent the trailing edge 24. The first tip wall 34 is typically integral with the airfoil first sidewall 18 and extends upwardly from the tip plate 28.

A second squealer tip wall 36 extends from adjacent the leading edge 22 along the airfoil second sidewall 20 to adjacent the trailing edge 24 and is laterally spaced from the first tip wall 34 to define an open-top tip cavity 38 therebetween. The second tip wall 36 is typically integral with the airfoil second sidewall 20 and also extends upwardly from the tip plate 28.

The first and second squealer tip walls 34, 36 are positioned closely adjacent to a conventional stationary stator shroud 40 during operation to define a suitable clearance therebetween, which clearance is preferably as small as possible for minimizing leakage of the combustion gas 16 therethrough as is conventionally known. The tip walls 34, 36 extend upwardly from the tip plate 28 so that in the event of rubbing between the walls 34, 36 and the inside surface of the shroud 40, only the tip walls 34, 36 are abraded, keeping intact the remainder of the airfoil 12 including the cooling chamber 30 therein. Since the first and second tip walls 34, 36 are integral portions of the respective airfoil first and second sidewalls 18, 20, they form portions of the working surfaces which extract energy from the combustion gas 16 during operation, and therefore the two walls 34, 36 typically extend equally in height and are equally spaced from the shroud 40.

Figure 2:
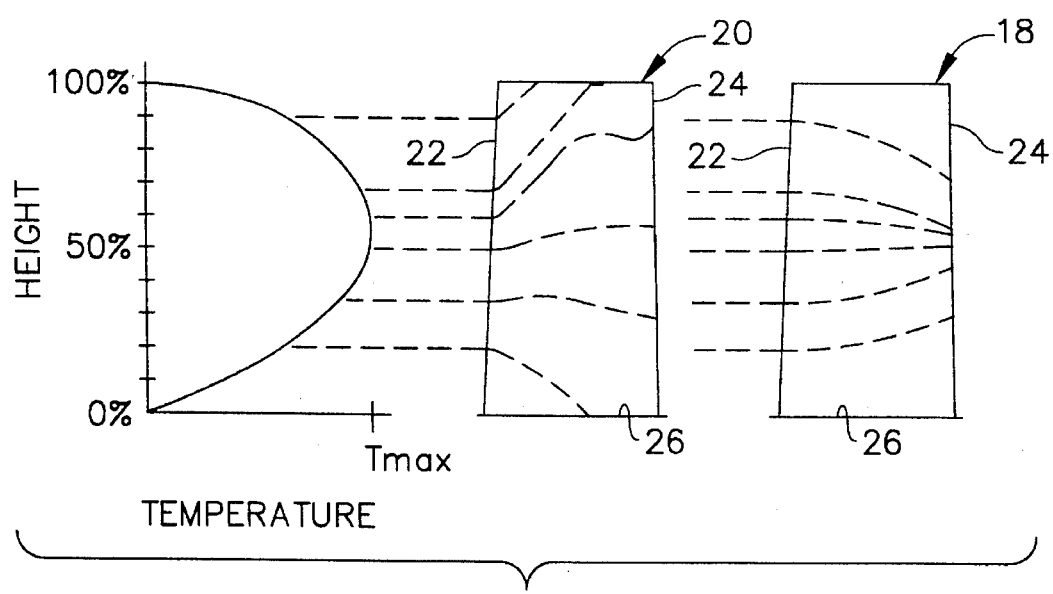
FIG. 2 is a schematic representation of an exemplary relative inlet temperature profile over pressure and suction sides of the blade illustrated in FIG. 1.

Illustrated in the left hand portion of FIG. 2 is an exemplary relative inlet temperature profile of the combustion gas 16 as experienced by the rotating blades 10 during operation. The temperature profile is generally center-peaked or generally parabolic with a maximum temperature $T_{max}$ typically located in the range of airfoil span or radial height of between 50% to about 70%, with zero % being at the blade root 26 and 100% being at the radially outermost portion or tip of the airfoil 12. The middle of FIG. 2 illustrates the corresponding gas temperature pattern experienced by the pressure side of the airfoil 12 during operation over the second sidewall 20, and the right side of FIG. 2 illustrates the gas temperature pattern experienced over the suction side of the airfoil 12 over the first sidewall 18.

The temperature patterns illustrated in FIG. 2 are based on improved computational analysis conducted for explaining visual manifestations observed from used turbine rotor blades. Although the gas temperature pattern experienced by the airfoil 12 is typically center-peaked at the inlets or leading edges 22 of the several airfoils 12, secondary flow fields between circumferentially adjacent airfoils 12 distort the temperature profile substantially in the blade tip region on the pressure or second sidewall 20. The gas temperature at the pressure side tip region is substantially greater than the temperature on the suction side tip region, and increases with a substantial gradient primarily from the leading edge 22 to the mid-chord region upstream of the trailing edge 24 at the blade tip.

Accordingly, the tip region of blades subject to this type of gas temperature pattern require suitable cooling thereof for ensuring a suitably long useful life of the blade 10 during operation.

However, in accordance with the present invention, it is desirable to use the distorted gas temperature pattern illustrated in FIG. 2 in conjunction with the typical pressure distribution over the airfoil first and second sides 18, 20 for reducing the gas temperature otherwise experienced by the blade tip on the pressure, second sidewall 20 which thereby decreases the need for internal cooling using the cooling fluid 32, which will therefore increase overall efficiency of operation.

Figure 3:
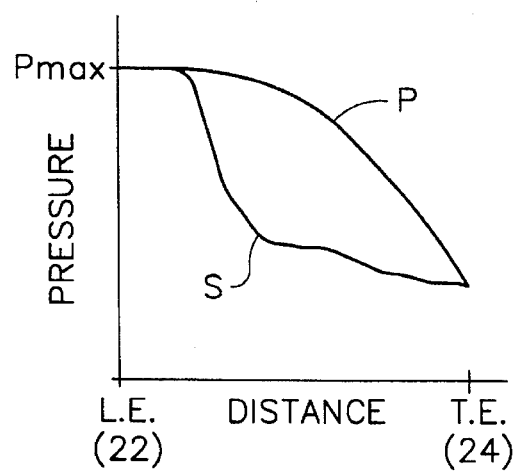
FIG. 3 is an exemplary graph plotting static gas pressure at the tip of the blade illustrated in FIG. 1 from the leading to trailing edges thereof and along the respective pressure and suction sides.

More specifically, FIG. 3 illustrates an exemplary static pressure distribution at the tip of the airfoil 12 between the leading edge 22 and trailing edge 24 thereof, with the pressure side profile being designated P and the suction side pressure profile being designated S. For a finite shod region adjacent to the leading edge 22, the static pressure along both the airfoil first sidewall 18 (S) and along the airfoil second sidewall 20 (P) are equal to each other and then diverge from each other with the pressure along the first, suction sidewall 18 being lower than the pressure along the pressure, second sidewall 20 up to about the region of the trailing edge 24.

Figure 4:
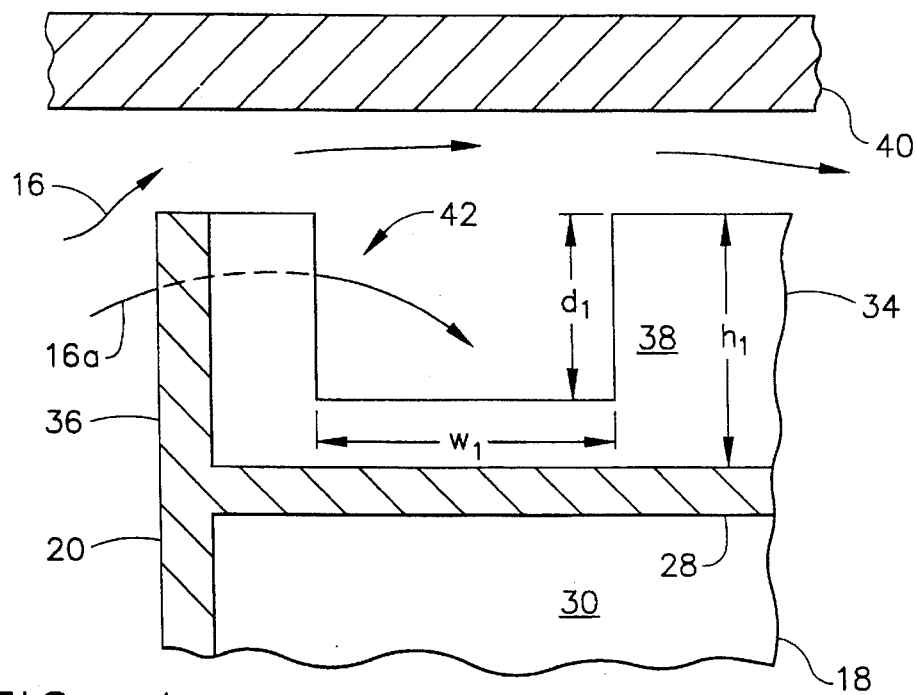
FIG. 4 is an elevational, partly sectional view of a portion of the tip of the blade illustrated in FIG. 1 adjacent to a stationary shroud and taken generally along line 4—4, and illustrates a first notch in the blade tip for receiving a portion of the combustion gases flowable over the blade airfoil.

Accordingly, and in accordance with the present invention, a first notch or slot 42 as shown generally in FIG. 1 and in more detail in FIG. 4, is disposed in one of the first and second tip walls 34, 36 adjacent to the airfoil leading edge 22 for channeling into the tip cavity 38 a portion 16a of the combustion gas 16 which flows over the airfoil 12. In order to drive the gas portion 16a into the tip cavity 38, suitable driving pressure is required and may be obtained by locating the first notch 42 in the region of the maximum static pressure at the leading edge 22, which as shown in FIG. 3 is in the region wherein the pressure and suction side pressures are generally equal. In the preferred embodiment illustrated in FIGS. 1 and 4, the first notch 42 is disposed in the airfoil first, or suction sidewall 18 closely adjacent to the leading edge 22. Since the pressure inside the tip cavity 38 downstream of the first notch 42 is necessarily lower than upstream of the first notch 42, a differential pressure will exist thereacross for channeling the gas portion 16a into the tip cavity 38.

FIG. 2 illustrates that along the pressure side blade tip the gas temperature at the leading edge 22 is substantially less than the gas temperature downstream of the leading edge 22. Accordingly, the relatively cooler, yet hot combustion gas 16 available at the blade leading edge 22 is channeled through the first notch 42 which defines an inlet to the tip cavity 38 which is bound on its sides by the first and second squealer tip walls 34, 36. This cooler combustion gas 16a therefore may be effectively used for reducing the gas temperature experienced at the blade tip downstream from the leading edge 22. In this way, the effect of the relatively hot combustion gas 16 at the pressure side blade tip downstream from the leading edge 22 as shown in FIG. 2 is reduced by channeling into the tip cavity 38 the cooler combustion gas portion 16a obtained adjacent to the leading edge 22 through the first notch 42.

Figure 5:
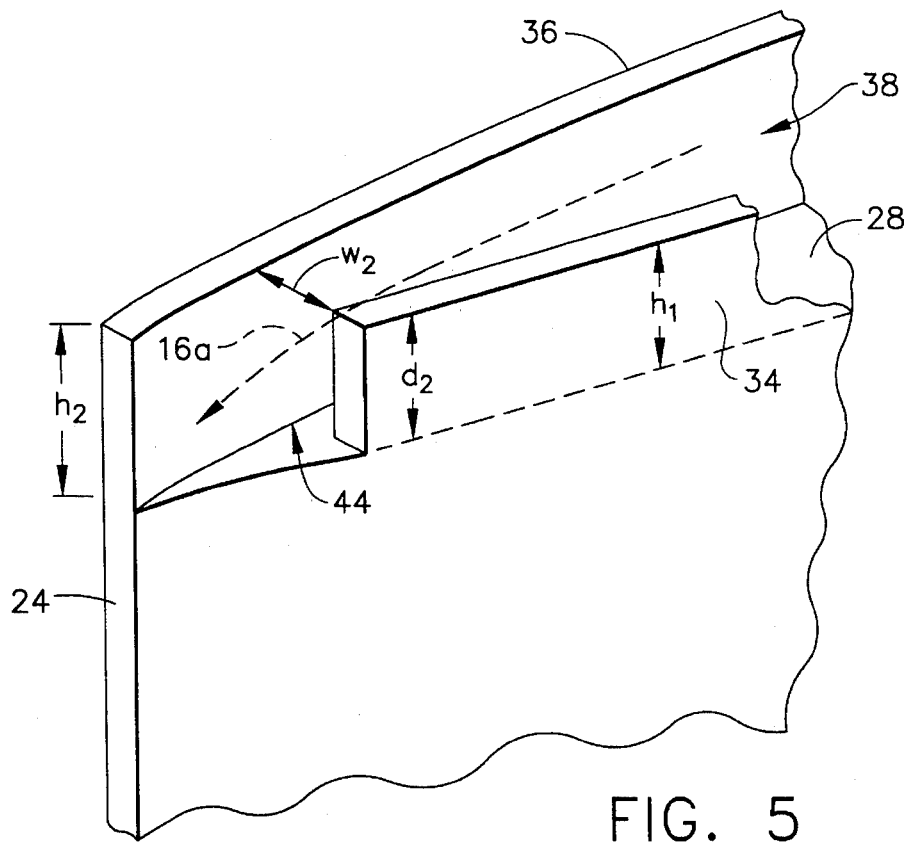
FIG. 5 is a perspective view of the trailing edge of the blade illustrated in FIG. 1 taken along line 5—5 illustrating in more detail a second notch in the blade tip for discharging gases from the tip cavity thereof.

In order to enhance the effectiveness of the introduction of the combustion gas portion 16a through the first notch 42, a second notch or slot 44 is disposed in one of the first and second tip walls 34, 36 adjacent to the airfoil trailing edge 24 as shown generally in FIG. 1 and in more particularity in FIG. 5 for defining an outlet for discharging in an aft direction the gas portion 16a channeled through the tip cavity 38 which promotes crossflow of the gas portion 16a from the first notch 42 through the tip cavity 38 to the second notch 44.

As shown in FIG. 4 some of the combustion gas 16 necessarily passes over the blade tip in the clearance region below the shroud 40 from the pressure side to the suction side of the airfoil 12. By preferentially causing the relatively cool combustion gas portion 16a to flow through the tip cavity 38, penetration of the hotter combustion gas 16 flowing over the blade tip below the shroud 40 into the tip cavity 38 is reduced, with recirculation of such hotter combustion gas also being reduced inside the tip cavity 38. Accordingly, the temperature experienced by the blade tip from the combustion gas 16 may be effectively reduced by channeling into the; tip cavity 38 the relatively cooler combustion gas portion 16a obtained adjacent to the leading edge 22, which when caused to flow through the tip cavity 38 decreases the recirculation of the hotter combustion gases therewith. And, a reduction in tip leakage of the combustion gas over the blade tip may also be obtained since the gas portion 16a provides an aerodynamic resistance to flow over the blade tip.

Accordingly, by reducing the gas temperatures experienced by the blade tip during operation, the separate requirement for cooling the blade tip is necessarily reduced which therefore may be used for increasing the overall efficiency of operation.

FIG. 3 illustrates that the static pressure adjacent the trailing edge 24 is relatively low and generally equal on both pressure and suction sides of the airfoil 12, and therefore the second notch 44 may be positioned in either the first or second squealer tip wall 34, 36. However, in the preferred embodiment illustrated in FIGS. 1 and 5, the second notch 44 is disposed in the first, or suction side, tip wall 34 as is the first notch 42.

The first and second notches 42, 44 may take any suitable form for providing an inlet and outlet for the tip cavity 38 through its sidewalls 34, 36 and below the radially outer tip ends thereof. In the preferred embodiment illustrated in FIGS. 1, 4, and 5, the first and second sidewalls 34, 36 have respective heights $h_1$ and $h_2$ which are substantially equal for maximizing the surface area of the working suction and pressure sidewalls 18, 20 of the airfoil 12. As shown in FIG. 4, the first notch 42 is generally rectangular in configuration and preferably extends partly into the first tip wall 34 from the top thereof with a depth $d_1$ measured downwardly toward the tip plate 28. The first notch 42 has a corresponding width $w_1$ so that the inlet flow area is adequate for channeling an effective amount of the gas portion 16a into the tip cavity 38. The entire first notch 42 is preferably positioned suitably adjacent to the airfoil leading edge 22 within the region of maximum static pressure shown by FIG. 3. Since FIG. 2 indicates that the gas temperature experienced by the blade 10 increases radially inwardly from the blade tip, the depth $d_1$ should not be excessive since the larger the depth $d_1$, the greater the temperature of the gas portion 16a which will correspondingly decrease the temperature reducing effect thereof within the tip cavity 38. As shown in FIG. 4, the first notch 42 extends suitably partly into the first tip wall 34 but above the tip plate 38 to obtain the lowest available combustion gas temperature. In alternate embodiments, the first notch 42 may extend completely to the tip plate 38 with $d_1$ being equal to $h_1$.

FIG. 5 illustrates an exemplary embodiment of the second notch 44 which has a depth $d_2$ and extends completely into the first tip wall 34 to the top of the tip plate 28, with the depth $d_2$ being equal to the height $h_1$ of the first tip wall 34. Also in this exemplary embodiment, the second tip wall 36 extends completely to the airfoil trailing edge 24, and the first tip wall 34 ends suitably short of the airfoil trailing edge 24, and is spaced laterally from the second tip wall 36 for defining the second notch 44 therebetween. In this way, the gas portion 16a after passing through the tip cavity 38 is discharged toward the trailing edge 24. The depth $d_2$ and the corresponding width $w_2$ of the second notch 44 are suitably selected for ensuring an effective crossflow of the gas portion 16a from the first notch 42 through the tip cavity 38 and out from the second notch 44. In alternate embodiments, the second notch 44 may extend partly into the first tip wall 34 if desired.

The combination of the first and second notches 42, 44 is effective for channeling into the tip cavity 38 the substantially cooler gas portion 16a available at the tip leading edge 22 which effectively reduces the resultant gas temperature in the tip cavity 38. The requirements for the cooling fluid 32 are therefore reduced for increasing engine efficiency. And, since the predominant direction of the flow of the gas portion 16a is along the blade chord from the first notch 42 to the second notch 44 and perpendicular to the direction of tip leakage flow over the blade tip, the tip leakage flow itself may also be reduced. Prolonged blade tip life and/or reduced tip cooling flow requirements from the invention improve the turbine performance.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims.

We claim:

1. A gas turbine engine rotor blade comprising an airfoil and integral dovetail for mounting said airfoil to a rotor disk, said airfoil including:

first and second sidewalls joined together at a leading edge and at a trailing edge, and extending from a root disposed at said dovetail to a tip plate, and a cooling chamber disposed in said airfoil for receiving cooling fluid through said dovetail;

a first tip wall extending upwardly from said tip plate along said airfoil first sidewall from adjacent said leading edge to adjacent said trailing edge;

a second tip wall extending upwardly from said tip plate along said airfoil second sidewall from said leading edge to adjacent said trailing edge, and being spaced from said first tip wall to define an open-top tip cavity therebetween; and a first notch disposed in said first tip wall adjacent said airfoil leading edge for channeling into said tip cavity a portion of combustion gas flowable over said airfoil.

2. A blade according to claim 1 wherein said airfoil is configured for effecting a pressure distribution along said first and second tip walls from said leading edge to said trailing edge, and said first notch is disposed adjacent said leading edge for channeling said gas portion inside said tip cavity due to differential pressure across said first notch.

3. A blade according to claim 1 further comprising a second notch disposed in one of said first and second tip walls adjacent said airfoil trailing edge for discharging said gas portion from said tip cavity and promoting crossflow of said gas portion from said first notch through said tip cavity to said second notch.

4. A blade according to claim 3 wherein both said first and second notches are disposed in said airfoil first tipwall.

5. A blade according to claim 4 wherein said airfoil first sidewall defines a suction side of said airfoil, and said second sidewall defines a pressure side of said airfoil.

6. A blade according to claim 5 wherein said first and second tip walls are substantially equal in height.

7. A blade according to claim 6 wherein said first notch extends at least partly into said first tip wall toward said tip plate.

8. A blade according to claim 6 wherein said second notch extends completely into said first tip wall to said tip plate.

9. A blade according to claim 6 wherein said second tip wall extends completely to said airfoil trailing edge, and said first tip wall ends short of said airfoil trailing edge, and is spaced from said second tip wall for defining said second notch therebetween.

* * * * *